US005898229A

United States Patent [19]

Murata et al.

[11] Patent Number: 5,898,229

[45] Date of Patent: Apr. 27, 1999

[54] STARTER WITH IMPROVED ONE-WAY CLUTCH STRUCTURE

[75] Inventors: Mitsuhiro Murata, Anjo; Shinya Yamanouchi, Toyohashi; Masanori Ohmi, Anjo; Tsutomu Shiga, Nukata-gun; Nobuyuki Hayashi, Nagoya, all of Japan

[73] Assignee: Denso Corporation, Kariya, Japan

[21] Appl. No.: 08/766,877

[22] Filed: Dec. 13, 1996

Related U.S. Application Data

[63] Continuation-in-part of application No. 08/680,118, Jul. 15, 1996, abandoned.

[30] Foreign Application Priority Data

| | | | |
|---|---|---|---|
| Sep. 18, 1995 | [JP] | Japan | 7-238127 |
| Jan. 31, 1996 | [JP] | Japan | 8-014818 |

[51] Int. Cl.$^{6}$ .............................. F02N 11/08; H02P 9/04

[52] U.S. Cl. .............................. 290/48; 290/10; 290/46; 290/47; 290/49; 310/75 R; 74/6; 74/7 R

[58] Field of Search .............................. 74/6, 7 R, 7 C, 74/7 E; 290/38 B, 38 R, 46; 310/239, 75 R

[56] References Cited

U.S. PATENT DOCUMENTS

| | | | |
|---|---|---|---|
| 4,587,861 | 5/1986 | Morishita | 74/7 E |
| 4,785,688 | 11/1988 | Shiozaki et al. | 74/710.5 |
| 4,989,467 | 2/1991 | Morishita et al. | 74/6 |
| 5,081,874 | 1/1992 | Isozumi | 74/7 A |
| 5,105,670 | 4/1992 | Isozumi et al. | 74/6 |
| 5,610,466 | 3/1997 | Shiga et al. | 310/239 |

FOREIGN PATENT DOCUMENTS

| | | |
|---|---|---|
| 132 648 | 2/1985 | European Pat. Off. . |
| 50-45522 | 5/1975 | Japan . |
| 58-214668 | 12/1983 | Japan . |
| 61-28756 | 2/1986 | Japan . |
| 61-268869 | 11/1986 | Japan . |
| 5-248329 | 9/1993 | Japan . |
| 994887 | 6/1965 | United Kingdom . |

*Primary Examiner*—Elvin G. Enad
*Attorney, Agent, or Firm*—Pillsbury Madison & Sutro LLP

[57] ABSTRACT

In a one way clutch of a starter having an outer member, inner member and rollers, a planet carrier is formed integrally with the outer member and through holes are formed avoiding cam chambers for rollers so as not to interfere with cam chambers formed in the inner circumferential surface of outer member. At one end portion of outer member, limiting portion for limiting the axial shifting of rollers is integrally formed, and at the other end surface, a limiting plate for limiting the axial shifting of rollers is provided and press-fitted into pins. The limiting portion may be replaced by another limiting plate. Through holes for the through holes are formed at locations where the outer member is radially thick, e.g., between circumferentially adjacent two of the cam chambers.

21 Claims, 5 Drawing Sheets

STARTER WITH IMPROVED ONE-WAY CLUTCH STRUCTURE

This application is a CIP of Ser. No. 08/680,118, filed Jul. 15, 1996, now abandoned.

BACKGROUND OF THE INVENTION

1. Field of the Invention

The present invention relates to a starter for starting an engine, and particularly to a starter with a clutch roller movement structure.

2. Description of Related Art

A starter having a planetary gear reduction mechanism and a one-way clutch is conventionally known by, for instance, JP-U 50-45522. The structure of the planetary gear reduction mechanism and one-way clutch of such a starter is shown in FIG. 7.

The planetary gear reduction mechanism is comprised of a sun gear 110 formed on the outer member circumference of an armature shaft 100, planetary gears 120 engaging with sun gear 110, an internal gear 130 engaging with planetary gears 120, and a planet carrier 140 for rotating by receiving a revolving power of planetary gears 120. Each planetary gear 120 is supported rotatably, via a bearing 160, on the outer member circumference of a pin 150 fixed on planet carrier 140.

The one-way clutch comprises an outer member 170 integrally formed with planet carrier 140 in an axially shifting position therefrom, an inner member 190 formed on the rear end portion of an output shaft 180, and rollers 200 disposed between outer member 170 and inner member 190. A limiting plate 210 for limiting a movement of rollers 200 in the axial direction is caulked and fixed onto planet carrier 140 by a clutch cover 220.

However, since the abovementioned starter requires an additional part (clutch cover 220) other than the one-way clutch constituting members, such as outer member 170, rollers 200, inner member 190 and limiting plate 210, the number of required parts increases and the number of fitting works increases accordingly.

Also, in this starter, centering of outer member 170 is made by contacting the inner circumferential surface of planet carrier 140 with the outer circumferential surface of output shaft 180. Since this centering is performed at one side of roller 200 in the axial direction, and outer member 170 is likely to become out of balance at the time of high speed rotation, the gears of the planetary gear reduction mechanism might be damaged when an imbalanced load is added to outer member 170. To overcome this problem, a centering method of contacting the inner circumferential surface of limiting plate 210 with the outer circumferential surface of output shaft 180 at both sides of rollers 200 has been considered. In this case, since limiting plate 210 is caulked and fixed with planet carrier 140 (outer member 170) by clutch cover 220, there is a possibility that limiting plate 210 will shift in the radial direction with respect to outer member 170 and it is difficult to perform the centering surely.

Further, at the time of driving when the revolving power of planetary gears 120 is transmitted to planet carrier 140 via pins 150, a heavy load is generated at a press-fitting portion 151 of pins 150 with respect to planet carrier 140. Therefore, a length 1 of press-fitting portion 151 of pins 150 should be taken long enough. As a result, planet carrier 140 has to be designed long in the axial direction, a total length of the starter becomes long and it would bring a contrary result to a compactness requirement of the same.

SUMMARY OF THE INVENTION

The present invention having been made in view of the above-described problems has a first object of improving a one-way clutch structure for a starter.

The present invention has a second object of shortening a total length of a starter with an improved clutch roller movement limiting structure.

The present invention has a third object of reducing the number of required parts and required fitting works.

The present invention has a fourth object of simplifying a centering operation of an outer member surely.

The present invention has a fifth object of reducing a one-way clutch in size while maintaining strength of a clutch outer member and planetary gear support pins.

According to one aspect of the present invention, pins and rollers of a one-way clutch are not positioned opposing each other in the axial direction, but the pins are directly fixed to an outer member passing through one side of the rollers. With the outer member being constituted as a planet carrier of a planetary gear reduction mechanism, a length in the axial direction of a starter can be reduced by the length of the planet carrier, compared with the conventional starter in which the outer member and the planet carrier are positioned shifted in the axial direction.

Preferably, a limiting plate is fixed to the pins so that there remains no need of a conventionally used fixing member such as a clutch cover for fixing the limiting plate. This reduces the number of required parts and the number of required fitting works, and further a production cost.

More preferably, the inner circumferential surface of the limiting plate fixed to the pins and the inner circumferential surface of the limiting portion provided at the end portion of the outer member contact with the outer circumferential surface of the inner member or the outer circumferential surface of the output shaft. This enables centering operation of the outer member to be done at the both sides the rollers. With the limiting plates and the outer member being fixed via the pins, the limiting plates do not shift in the radial direction with respect to the outer member, and the centering of the outer member can be performed surely.

More preferably, the pins are passed through in the axial direction with respect to the outer member. This enables a provision of the limiting plates at both end surfaces of the outer member, and the same can be fixed to the pins respectively. In this case, there is no need of placing a limiting portion for limiting a movement of the rollers for the outer member, and a configuration of the outer member can be simplified.

Still preferably, in a structure in which the limiting plates are disposed on both end surfaces of the outer member, the inner circumferential surfaces of the both limiting plates are fitted in contact with either the outer circumferential surface of the inner member or the outer circumferential surface of the output shaft. The centering operation of the outer member can be performed at the both sides of the rollers. In this case, since each limiting plate is fixed to the outer member via the pins respectively, the limiting plates do not shift in the radial direction with respect to the outer member, therefore, the centering operation of the outer member can be done surely.

According to another aspect of the present invention, a one-way clutch which transmits a rotation force of a planetary gear reduction mechanism to an output shaft includes an inner member fixed to the output shaft, an outer member forming a plurality of wedge-shaped cam chambers circumferentially relative to an outer circumference of the inner member, and rollers disposed in the cam chambers, and support pins are press-fitted into the outer member to rotatably support the planetary gears thereon. Further, each of the pins is positioned between circumferentially arranged two of the cam chambers, fitted axially to a length which overlaps at least a part of the rollers, and is positioned so that at least a part thereof resides radially inside a radially outermost portion of the cam chambers.

Preferably, the outer member has through holes formed through the outer member axially to receive axially the support pins.

Preferably, the cam chambers are provided circumferentially at least at three locations at which the outer member has a radial thickness thicker than that at radially outside the cam chambers.

Preferably, the rollers has a diameter larger than that of the support pins.

BRIEF DESCRIPTION OF THE DRAWINGS

Other features and advantages of the present invention will become more apparent from the following detailed description when read with reference to the accompanying drawings, in which.

DETAILED DESCRIPTION OF PRESENTLY PREFERRED EMBODIMENTS

Figure 1:
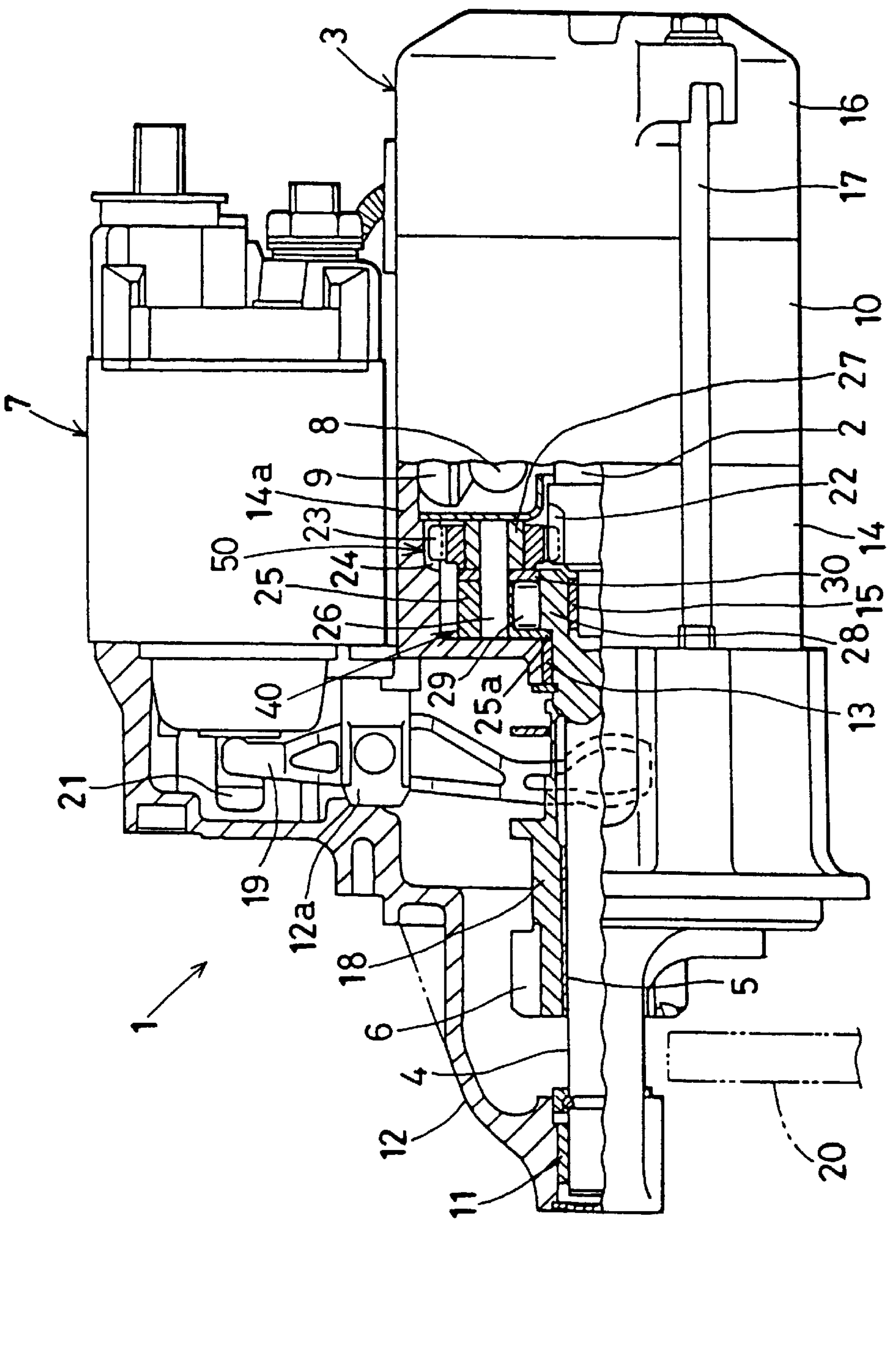
FIG. 1 is a partially cross-sectional view illustrating a starter according to a first embodiment of the present invention.

Embodiments of a starter according to the present invention will now be explained in more detail with reference to the accompanying drawings, in which the same or similar parts are denoted by the same reference numerals.

(First Embodiment)

In FIG. 1, illustrating a first embodiment of the invention, a starter 1 comprises a motor 3 for generating a rotational power to an armature shaft 2 upon energization, an output shaft 4 disposed coaxially with armature shaft 2 in front of motor 3 (the left-hand side of FIG. 1), a pinion 6 press-fitted on the outer circumference of output shaft 4 via a bearing 5, a planetary gear reduction mechanism 50 for reducing the rotational speed of motor 3 (explained later), one-way clutch 40 for transmitting the rotational power to output shaft 4 from the planetary gear reduction mechanism (explained later), a magnet switch 7 for conducting electricity to motor 3 as well as generating pushing power of pinion 6, and so on.

Motor 3 is comprised of an armature 8 having armature shaft 2, fixed poles 9 disposed around the outer circumference of armature 8, a cylindrically-shaped yoke 10 for fitting fixed poles 9 to the inner circumferential surface thereof, and so on. Motor 3 starts its rotation after a starter switch (not shown) is turned on, built-in contact points (not shown) in magnet switch 7 are closed and armature 8 is energized.

The front end portion of output shaft 4 is supported rotatably by the front end portion of a front housing 12 via a bearing 11, and the rear end side thereof is supported rotatably by a center case 14 via a bearing 13. At the middle portion of the rear end of output shaft 4, a recessed portion having a cylindrical hollow space is formed along the axial direction, and a front end of armature shaft 2 is supported rotatably by a bearing 15 disposed within the recessed portion.

Center case 14 is sandwiched together with yoke 10 between front housing 12 and rear housing 16, covering the planetary gear reduction mechanism and the outer circumference of the one-way clutch, so that the entire construction is fixed with a plurality of through bolts 17.

The pinion 6 is integrally provided with a spline tube 18 which is helical-spline-fitted with the outer circumference of output shaft 4. Pinion 6 comes into an engagement with a ring gear 20 of an engine by a movement in which spline tube 18 is pushed forward along the helical spline on the output shaft 4 via a lever 19. One end of lever 19 is engaged with the outer circumference of spline tube 18 and the other end is engaged with a rod 21 projecting into the front end side of the magnet switch 7, with its middle portion being supported pivotally by a supporting portion 12*a* of the front housing 12.

Planetary gear reduction mechanism 50 is a speed reduction device which reduces the rotational speed of motor 3 to increase an output torque, and is comprised of a sun gear 22 formed on the outer circumference of armature shaft 2, three planetary gears 23 engaged with sun gear 22, an internal gear 24 engaged with each planetary gear 23 and a planet carrier 25 to which a revolving power of planetary gears 23 is transmitted.

Sun gear 22 transmits the rotation of armature shaft 2 to three planetary gears 23 by rotating integrally with armature shaft 2.

Three planetary gears 23 are respectively supported rotatably via bearings 27 by pins 26 fixed onto planet carrier 25 and revolve around the outer circumference of sun gear 22 engaging with sun gear 22 as well as with internal gear 24.

Internal gear 24 is formed in the inner circumferential surface of a cylindrical wall 14*a* of center case 14.

Planet carrier 25 is integrally formed with an outer member of a one-way clutch (the same reference numeral is given as planet carrier 25), and rotates by receiving the revolving power of planetary gears 23. Three through holes are provided on planet carrier 25, and pins 26 are press-fitted into the through holes respectively.

The one-way clutch is comprised of an outer member 25, an inner member 28, rollers 29, springs (not shown) and so on.

A plurality of wedge-shaped cam chambers (not shown) are formed in the inner circumferential surface of outer member 25, and rollers 29 are accommodated in the cam chambers. Plural cam chambers are provided in the circumferential direction of outer member 25 at even-spacing. It is needless to say that through holes provided on planet carrier 25 are formed to avoid the cam chambers not to interfere with them. Therefore, pins 26 are press-fitted into the through holes of planet carrier 25 passing the sides of rollers 29, with respect to a relation between pins 26 press-fitted to the through holes and rollers 29 accommodated in the cam chambers. However, pins 26 are not necessarily to be provided passing through the radially outer circumference of rollers 29, and it is sufficient that the positions of pins 26 and roller 29 overlap in the radial direction as long as the through holes are formed avoiding the cam chambers.

At an end portion of outer member 25 (the left-hand side in FIG. 1), a limiting portion 25*a* for limiting the shifting of rollers 29 in the axial direction is integrally formed as a limiting plate. Limiting portion 25*a* is provided by extending the end portion of outer member 25 into the inner circumferential side in a siding-wall shape so that its inner circumferential surface contacts the outer member circumferential surface of output shaft 4. On the other end surface of outer member 25, a limiting plate 30 for limiting the shifting of rollers 29 in the axial direction together with limiting portion 25*a* is provided. Limiting plate 30 is press-fitted into pins 26 fixed into planet carrier 25, and its inner circumferential surface contacts the outer circumferential surface of inner member 28. It is to be noted that the other end face (at the side of planetary gears 23) of outer member 25 and an end face (at the side of planetary gears 23) of rollers 29 form a substantially same plane.

Inner member 28 is provided in a state that the rear end portion of output shaft 4 is enlarged in the radial direction.

Rollers 29 are provided in a columnar shape and transmit the rotation of outer member 25 to inner member 28 by locking outer member 25 with inner member 28 by being pressed into narrower spaces of the cam chambers at the time of the rotation of outer member 25.

Springs are accommodated in the cam chambers with rollers 29 and pushing the rollers 29 into the narrower spaces of the cam chambers.

The magnet switch 7 attracts a plunger (not shown) accommodated therein by a magnetic force generated by built-in coils (not shown), when the previously mentioned starter switch is turned on and the coils are conducted. As a result, contact points of motor 3 is closed and pushing force to pinion 6 is generated by way of pivoting operation of lever 19 through rod 21.

An operation of starter 1 will be explained next.

When the starter switch is turned on, the contact point of motor 3 is closed by magnet switch 7, armature 8 is energized and a rotational power is generated at armature 8. Due to this, rotation of armature shaft 2 together with sun gear 22 drives to rotate three planetary gears 23. Although each planetary gear 23 is engaged with sun gear 22 as well as with internal gear 24, since internal gear 24 is provided on center case 14 and has a non-rotating structure, each planetary gear 23 self-rotates around pins 26 and revolves around the outer circumference of sun gear 22. The revolving power is transmitted to planet carrier 25 (outer member 25) via pins 26. Since the rotation of outer member 25 is transmitted to inner member 28 via rollers 29 further, output shaft 4 is driven to rotate.

On the other hand, pinion 6 which is fitted on output shaft 4, by an attracting force of magnet switch 7, engages a ring gear 20 by being pushed to the forward (the left-hand side in the Figure) on the axis of output shaft 4 integrally with the spline tube 18 via lever 19, so as to transmit the rotational power to ring gear 20.

When pinion 6 is rotated at a high speed by ring gear 20 after the engine is started later, the rotational speed of inner member 28 becomes higher than that of outer member 25. However, since rollers 29 shift to wider spaces of the cam chambers between inner member 28 and outer member 25 releasing the lock of inner member 28 and outer member 25, there occurs no transmission of the rotational power from inner member 28 to outer member 25 so that an overrun of armature 8 is prevented.

In this embodiment, since pins 26 are press-fitted into planet carrier 25 and limiting plate 30 for limiting the shifting of rollers 29 in the axial direction is fixed to pins 26, a conventionally used fixing member (e.g., clutch cover) for fixing limiting plate 30 is not required. Owing to this, since the number of required parts and fitting works can be reduced, the production cost can be reduced.

The centering of outer member 25 at the both sides of rollers 29 becomes possible by a structure that the inner circumferential surface of limiting plate 30 fixed to pins 26 and the inner circumferential surface of limiting portion 25*a* provided on the end portion of outer member 25 contacting both the outer circumferential surface of inner member 28 and the outer circumferential surface of output shaft 4. Therefore, an improved balancing of outer member 25 brings more stable balance of the same at high rotational speeds such as at idling speed rotation. Therefore, noises caused by the imbalance of outer member 25 can be reduced, an offset load can be prevented, and damages of the gears of the planetary gear reduction mechanism can be also prevented.

Pins 26 are fixed with planet carrier 25 passing the sides of rollers 29 without pins 26 and rollers 29 opposing in the axial direction. By this construction, since outer member 25 and planet carrier 25 can be constructed integrally, compared with the conventional starter in which outer member and planet carrier are positioned shifting in the axial direction, the axial length can be reduced by the length of planet carrier. According to the structure of this embodiment, compared with the conventional starter, the press-fitting length of pins 26 with respect to planet carrier 25 can be made longer, a surface pressure of the press-fitting portion of pins 26 can be reduced, and therefore, pins 26 can be made with a smaller diameter.

(Second Embodiment)

Figure 2:
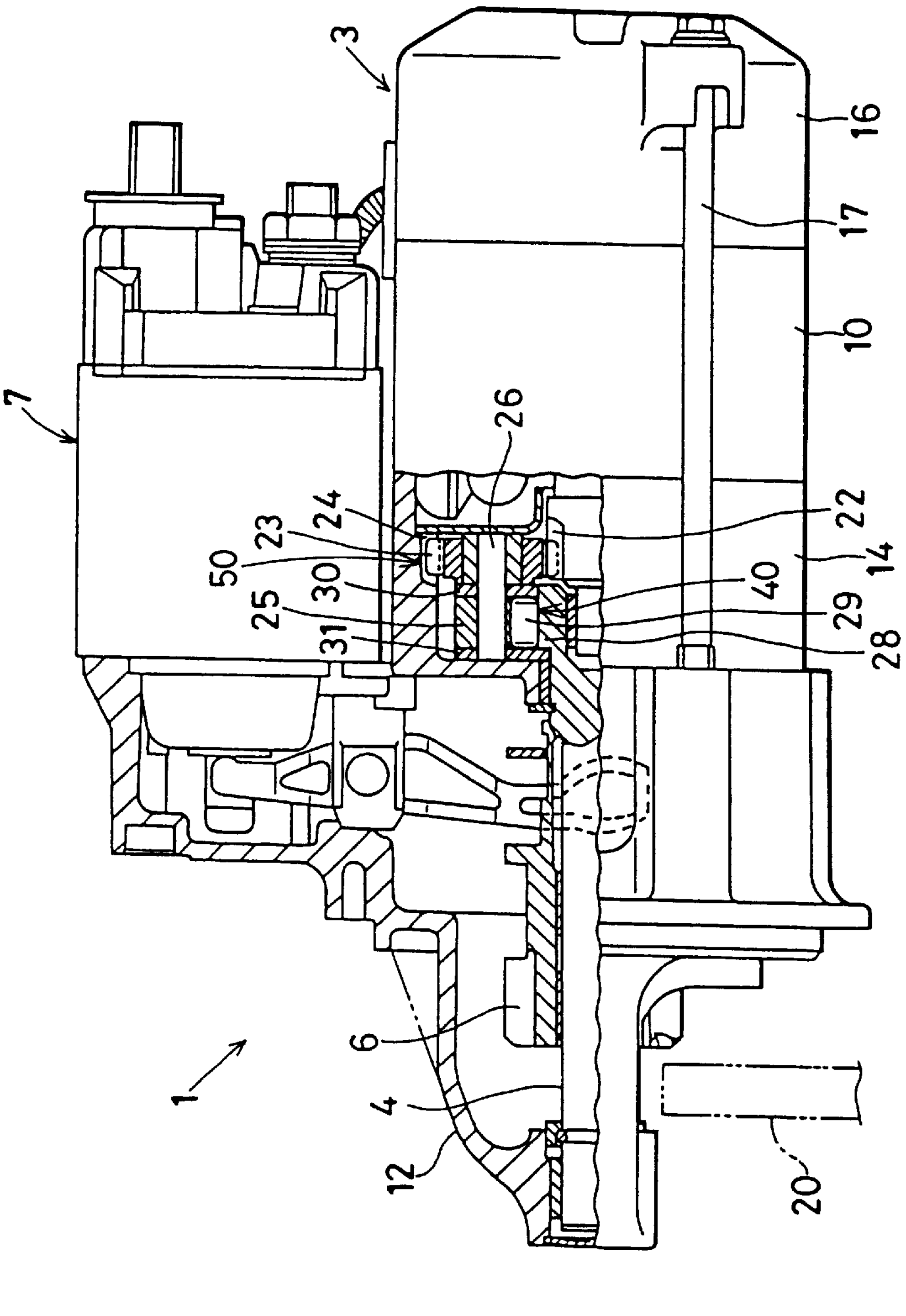
FIG. 2 is a partially cross-sectional view illustrating a starter according to a second embodiment of the present invention.

In FIG. 2 illustrating a second embodiment, two limiting plates 30 and 31 are disposed at the both surfaces of outer member 25 respectively, and each limiting plate 30 and 31 is press-fitted into pins 26. In this case, since a limiting portion 25*a* (used in the first embodiment of FIG. 1) for limiting a shifting of rollers 29 is not required, a configuration of outer member 25 can be simplified, and the production of the same becomes simple. In this second embodiment, the axial lengths of the outer member 25 and the rollers 29 are made substantially equal.

(Variations)

In the first embodiment, limiting portion 25*a* is provided at one axial end portion of outer member 25 and limiting plate 30 is disposed at the other axial end surface, but the same advantage is obtained even when the positions of the limiting portion 25*a* and limiting plate 30 are reversed. That is, limiting plate 30 is disposed at one end surface of outer member 25 and limiting portion 25*a* is formed integrally at the other end portion.

In the first embodiment, the inner circumferential surface of limiting portion 25*a*, and in the second embodiment, the inner member circumferential surface of limiting plate 31, contact the outer circumferential surface of output shaft 4 respectively. It is also possible, however, to enlarge a width of inner member 28 in the axial direction to the side of pinion 6 so that the inner member circumferential surface of limiting portion 25*a* and the inner member circumferential surface of limiting plate 31 contact with the outer member circumferential surface of inner member 28.

Although, through holes are formed on planet carrier 25 and pins 26 are press-fitted into the through holes in each embodiment, there is no need of press-fitting pins 26 axially to the full axial length of the through holes. As long as the press-fitting length which can resist the load at the time of driving can be obtained, it can have a structure in which the pins 26 are press-fitted halfway into planet carrier 25.

(Third Embodiment)

Figure 3:
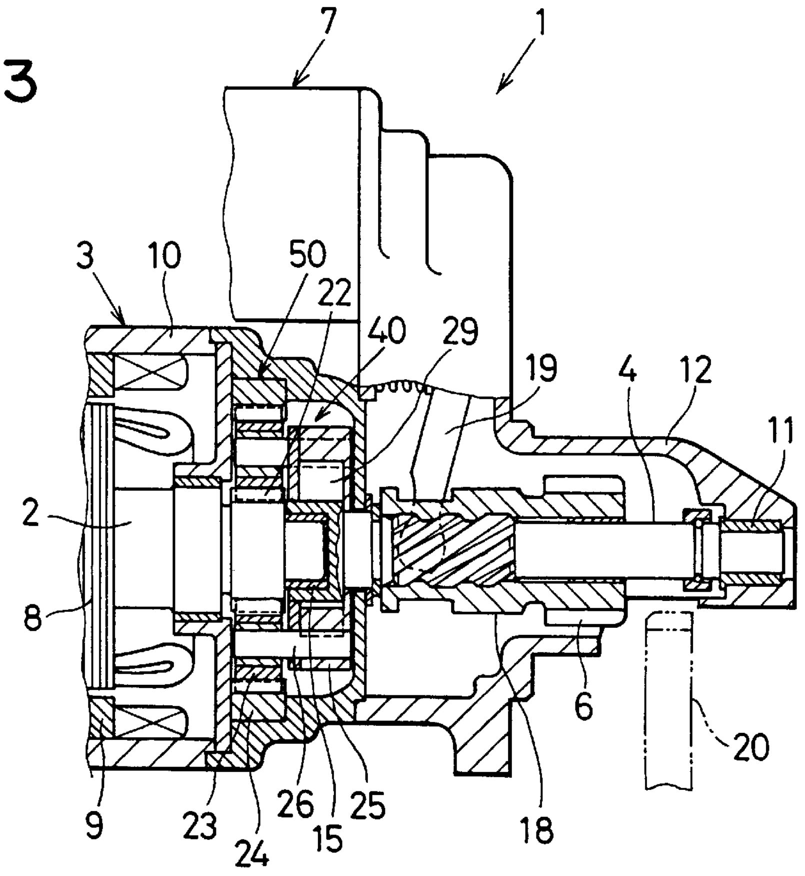
FIG. 3 is a partially cross-sectional view illustrating a starter according to a third embodiment of the present invention.
Figure 4:
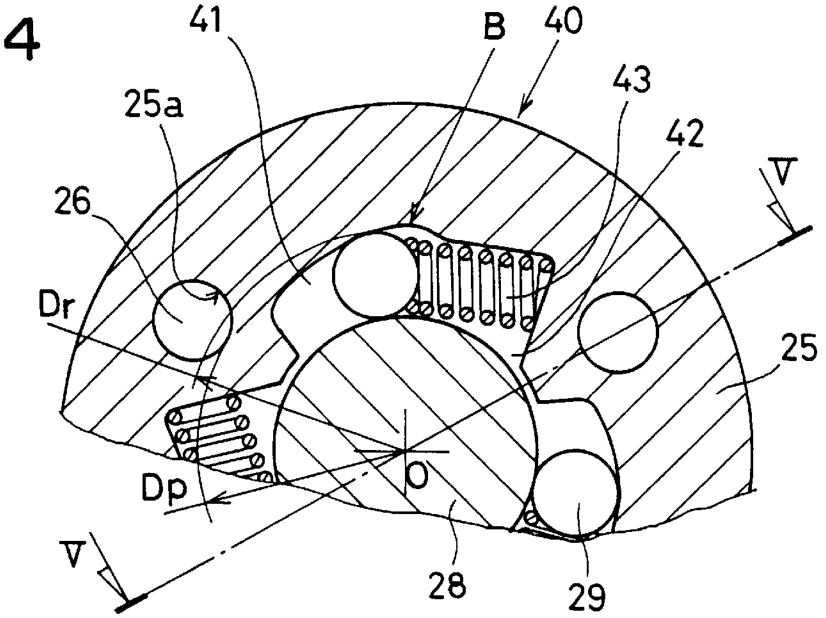
FIG. 4 is a sectional view illustrating a one-way clutch used in the third embodiment of FIG. 3.
Figure 5:
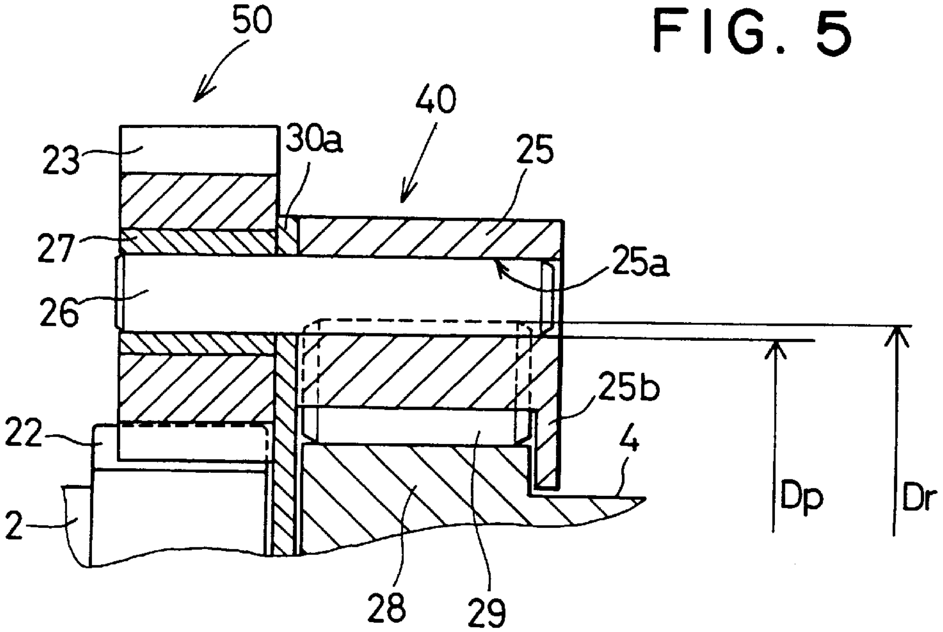
FIG. 5 is a sectional view illustrating the one-way clutch taken along the line V—V in FIG. 4.

In a third embodiment illustrated in FIGS. 3 through 5, the structure of the one-way clutch is modified from the foregoing embodiments.

As illustrated in FIG. 3, a clutch inner member 28 is formed by enlarging radially the diameter of an output shaft 4 to rotate with the output shaft 4. As illustrated in FIGS. 4 and 5, a clutch outer member (planet carrier) 25 disposed radially outside the inner member 28 is formed with a plurality of wedge-shaped cam chambers 41 for storing corresponding rollers 29 and spring chambers 42 for storing corresponding springs 43. The spring chambers 42 extends from the corresponding cam chambers 41 circumferentially at a radially innermost surface of the outer member 46. The outer member 46 is rotatable with planetary gears 23 which revolve around a sun gear 22. Each roller 29 is in a cylindrical shape and normally biased by the corresponding spring 43 toward a narrower space (in the counterclockwise direction in FIG. 4). A clutch cover 30*a* is disposed at the side of planetary gear reduction mechanism 50 to restrict the axial movement of the rollers 29 toward the reduction mechanism 50, while a plate 25*b* formed integrally with the outer member 25 radially inwardly is placed at the side axially opposite to the reduction mechanism 50 to restrict the axial movement of the rollers 29 toward a pinion 6.

Support pins 26 are press-fitted into corresponding through holes 25*a* formed in the clutch outer member (planet carrier) 25. Each hole 15*a* passes through the outer member 25 in the thickness direction and is positioned at the radially thickest portion of the outer member 25, i.e., between the circumferentially arranged pairs of cam chamber 41 and the spring chamber 42. Further, the hole 25*a* is formed so that its innermost portion is radially inside the outermost portion B of the cam chamber 41. That is, the radius Dp from the center O of the inner member 28 to the innermost portion of the hole 25*a* is set shorter than the radius Dr from the center O to the outermost portion B. Here, the outermost portion B is on the circle defined by the radius Dr in FIGS. 4 and 5 and is radially the farthest from the outer circumference of the inner member 28 where the space for the roller 29 is the widest. As illustrated in FIG. 5, the pins 26 are press-fitted axially into the holes 25*a* over the substantially the entire length of the holes 25*a*, or the entire thickness of the outer member 25.

The one-way clutch 40 in the third embodiment operates in the same manner as in the foregoing embodiments.

According to the third embodiment, the pins 22 rotatably supporting the planetary gears 23 are press-fitted over the entire thickness of the outer member (planet carrier) 26, the axial press-fitted length of the pins 26 can be assured in the outer member 25 without thickening the outer member 25 in the axial direction. Thus, the axial length of the one-way clutch 40 may be shortened.

Further, since a part of the pin 26 may be placed radially inside the outermost portion B of the cam chamber 30, i.e., (Dp<Dr), the distance between the radial centers of the sun gear 22 and the pin 26 need not be changed even in the case the roller 29 has the same diameter as the conventional one. As a result, without reducing the mechanical strength of the outer member 25 and the pin 26, the axial length of the one-way clutch 40 can be shortened and the starter 1 can be reduced in both its size and weight.

Still further, since each pin 26 is press-fitted at the position between the circumferentially adjacent two of the cam chambers 41, the cam chambers 41 can be widened. Thus, the diameter of the rollers 29 can be made large enough to reduce the surface pressure of the rollers 26 relative to the inner member 28 and the outer member 25. Thus, the diameter of the rollers 29 are made larger than that of the pins 26. With the reduction in the surface pressure, the number of the rollers 29 may be reduced and the number of the component parts (rollers 29, springs 43 and chambers 41 and 42 therefor) may be reduced. In actual practice the clutch structure comprising chambers 41 and 42, roller 26 and spring 43 may be provided only at three locations circumferentially, while enabling centering of the inner member 28 and the outer member 25.

Furthermore, since the through holes 25*a* formed in the outer member 25 do not interfere with the cam chambers 41 or the spring chambers 42, the through holes 25*a* need not be blinded but may be formed to pass through the outer member 25 in the thickness direction or in the axial direction. Thus, with respect to the hole length or depth, drilling the through holes will obviate special drilling care which would otherwise be required in the case of drilling blinded holes.

It is to be noted that the pins 26 need not be as long as the full axial length or thickness of the outer member 25 but may be in a shorter length which assures the required mechanical strength. This will further reduce the weight of the starter.

(Fourth Embodiment)

Figure 6:
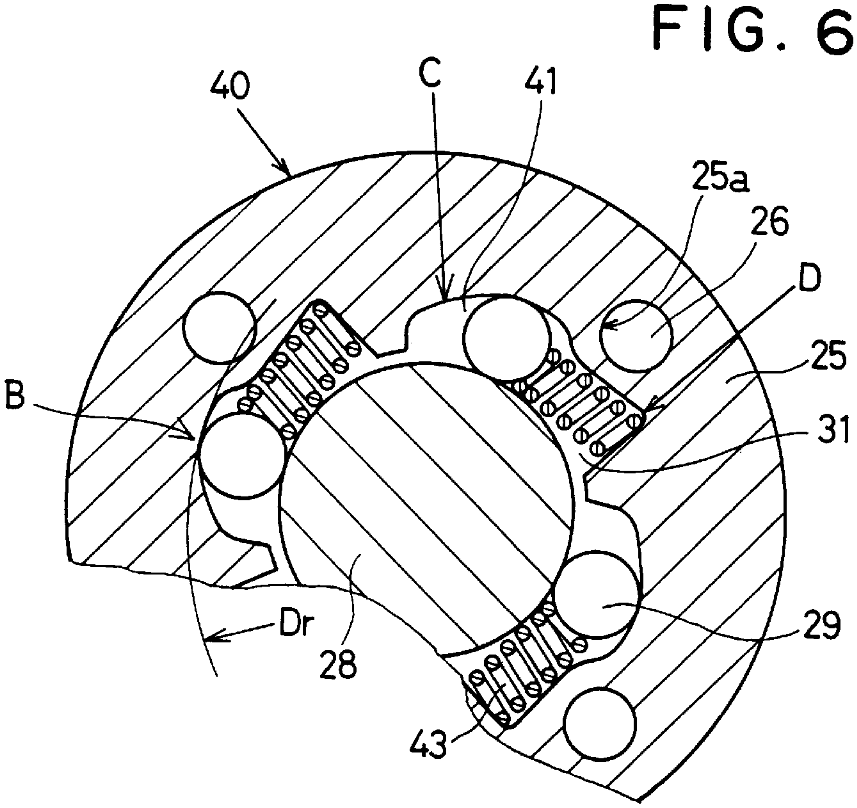
FIG. 6 is a cross-sectional view illustrating a one-way clutch according to a fourth embodiment of the present invention.
Figure 7:
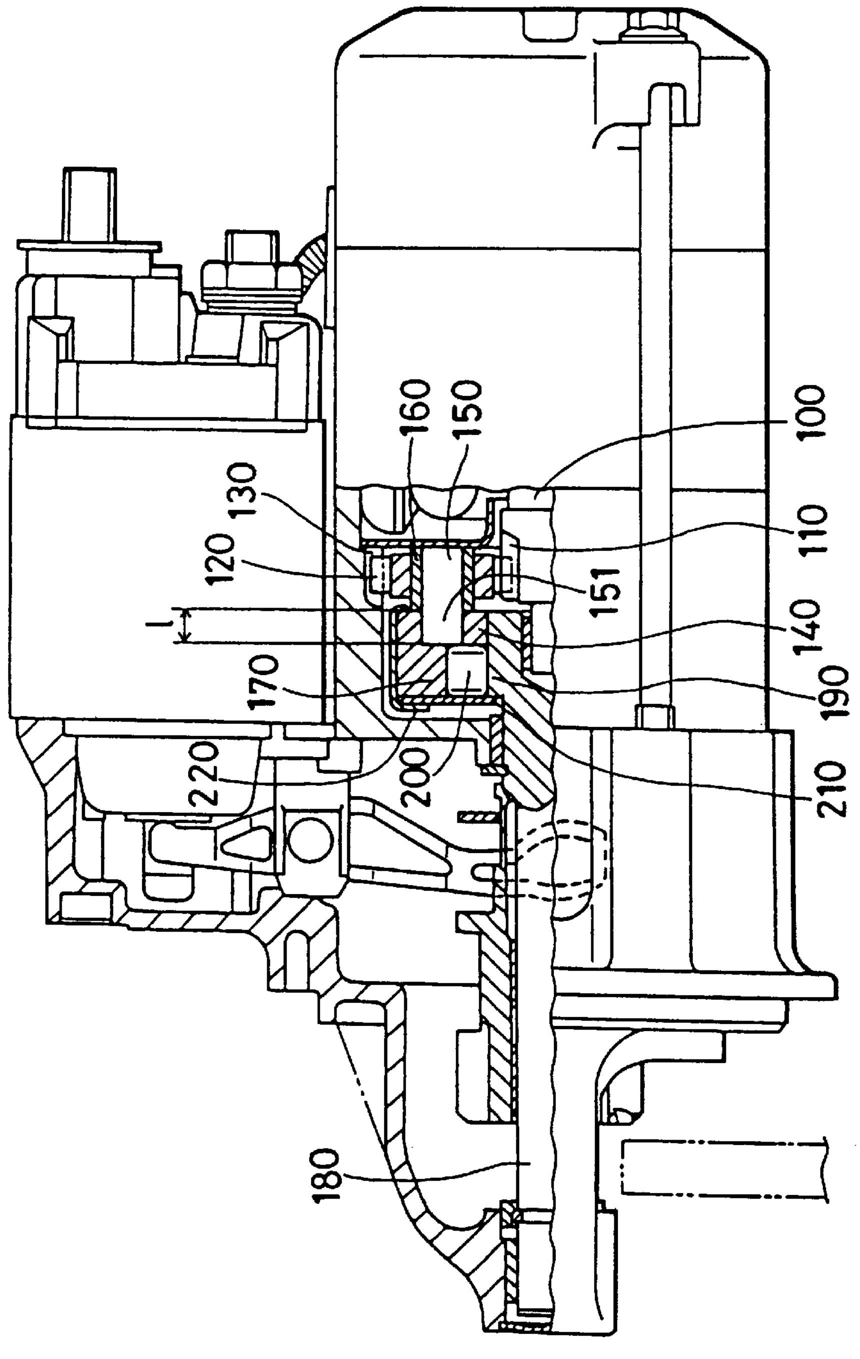
FIG. 7 PRIOR ART
FIG. 7 is a partially cross-sectional view illustrating a conventional starter.

In a fourth embodiment illustrated in FIG. 6, in consideration of the fact that the largest stress will concentrate on the portions C and D of the outer member 25 when the rollers 29 move to the narrowest portions of the cam chambers 41, the through holes 25*a* are formed between the portions C and D, particularly at the position radially outside the spring chambers 31, at which the outer member 25 is thicker radially than radially outside the cam chamber 41. Thus, the pins 26 can be fitted without weakening the strength of the outer member 25. In this embodiment, the through holes 25*a* are so positioned that the radially innermost portions of the holes 25*a* and the pins 26 are radially inside the widest portion B of the cam chamber 41, i.e., radially inside the arc of radius Dr.

The present invention should not be restricted to the above-described embodiments and variations but may be modified in various other ways without departing from the spirit and the scope of the invention.

What is claimed is:

1. A starter comprising:

a motor;

an output shaft having a pinion thereon;

a planetary gear reduction mechanism having planetary gears for reducing a rotational speed of said motor;

a one-way clutch having an outer member for being rotated by said planetary gears, an inner member formed at a rear end of said output shaft, and rollers disposed between said outer member and said inner member; and pins supporting said planetary gears thereon and fixed to said outer member, said pins being disposed so as to be at least one of radially and angularly offset with respect to said rollers so as to be free from interference therewith, wherein;

said one-way clutch has a limiting plate disposed on an end surface of said outer member for limiting a shifting of said rollers in an axial direction, and said limiting plate is fixed to said pins.

2. A starter according to claim 1, wherein;

said outer member has an integral limiting portion disposed at an end portion opposite to an end surface, at which said limiting plate are disposed, for limiting said shifting of said rollers in said axial direction with said limiting plate, and an inner circumferential surface of said limiting portion and an inner circumferential surface of said limiting plate contact at least one of an outer circumferential surface of said inner member and an outer circumferential surface of said output shaft.

3. A starter according to claim 1, wherein;

said limiting plate is disposed at both end surfaces of said outer member and fixed to said pins respectively.

4. A starter according to claim 3, wherein;

each inner circumferential surface of said limiting plate contacts at least one of said outer circumferential surface of said inner member and said outer circumferential surface of said output shaft.

5. A starter for an engine having a ring gear, comprising:

an output shaft having a pinion thereon for engagement with said ring gear;

a starter motor having an armature with an armature shaft;

a speed reduction mechanism having a sun gear formed on said armature shaft, planetary gears engaged with said sun gear and rotatably supported via support pins, and an internal gear engaged with said planetary gears, said mechanism transmitting a rotation of said armature shaft to said output shaft in a reduced speed; and a one-way clutch having an inner member fixed to said output shaft, an outer member facing radially said inner member and opening axially toward said planetary gears, and rollers disposed between said inner member and said outer member, an end face of said outer member and end faces of said rollers being on a same plane at a side of said planetary gears, wherein said support pins extend from said end face of said outer member toward said planetary gears, and further comprising:

a limiting plate disposed on said end face of said outer member for limiting an axial movement of said rollers, and fixed to said support pins for said planetary gears.

6. A starter according to claim 5, wherein;

an inner circumferential surface of said limiting plate is kept in contact with an outer circumferential surface of said inner member.

7. A starter according to claim 5, further comprising:

a limiting portion formed integrally with said outer member at another end face of said outer member for limiting the axial movement of said rollers.

8. A starter according to claim 7, wherein;

an inner circumferential surface of said limiting portion is kept in contact with an outer circumferential surface of said output shaft.

9. A starter according to claim 5, wherein;

an axial length of said outer member is substantially equal to that of said rollers; and limiting plates are disposed on both axial ends of said outer member for limiting an axial movement of said rollers.

10. A starter according to claim 9, wherein;

an inner circumferential surface of one of said limiting plates is kept in contact with an outer circumferential surface of said inner member, and an inner circumferential surface of another of said limiting plates is kept in contact with an outer circumferential surface of said output shaft.

11. A starter comprising:

a motor;

an output shaft having a pinion thereon;

a planetary gear reduction mechanism having planetary gears for reducing a rotational speed of said motor;

a one-way clutch disposed to transmit a rotation force from said reduction mechanism to said output shaft, said clutch including an inner member fixed to said output shaft, an outer member forming a plurality of wedge-shaped cam chambers circumferentially relative to an outer circumference of said inner member, and rollers disposed in said cam chambers; and pins press-fitted into said outer member to rotatably support said planetary gears thereon, wherein each of said pins is positioned between circumferentially arranged two of said cam chambers, fitted axially to a length which overlaps at least a part of said rollers, and is positioned so that at least a part thereof resides radially inside a radially outermost portion of said cam chambers;

a limiting plate disposed on an axial end face of said outer member for limiting an axial movement of said rollers, and fixed to said support pins for said planetary gears, wherein said limiting plate is positioned so as to be adjacent to an axial end of each said roller.

12. A starter according to claim 11, wherein:

said outer member has through holes for receiving axially said support pins and said through holes pass through said outer member axially.

13. A starter according to claim 11, wherein:

said cam chambers are provided circumferentially at least at three locations.

14. A starter according to claim 11, wherein:

said rollers have a diameter larger than that of said support pins.

15. A starter comprising:

a motor;

an output shaft having a pinion thereon;

a planetary gear reduction mechanism having planetary gears for reducing a rotational speed of said motor;

a one-way clutch disposed to transmit a rotation force from said reduction mechanism to said output shaft, said clutch including an inner member fixed to said output shaft, an outer member forming a plurality of wedge-shaped cam chambers and a plurality of biasing member chambers, each extending circumferentially relative to an outer circumference of said inner member, each said biasing member chamber being open to a respective cam chamber, each said cam chamber having a radially narrower space and a radially wider space, said narrower space being defined at a side of said cam chamber circumferentially opposite to said respective biasing member chamber, rollers disposed respectively in said cam chambers, and biasing members for respectively biasing said rollers toward said narrower spaces of said cam chambers disposed respectively in said biasing member chambers; and pins fixed to said outer member to rotatably support said planetary gears thereon, wherein each of said pins is positioned at a location other than radially outside of said cam chambers and fitted axially to a length which overlaps at least a part of said rollers.

16. A starter according to claim 15, wherein:

said outer member has through holes for receiving axially said support pins and said through holes pass through said outer member axially.

17. A starter according to claim 15, wherein:

said location is at a radially thickest portion of said outer member.

18. A starter according to claim 15, wherein:

said location is radially outside said biasing member chambers.

19. A starter according to claim 15, further comprising:

a limiting plate disposed on an axial end face of said outer member for limiting an axial movement of said rollers, and fixed to said pins for said planetary gears, wherein said limiting plate is positioned so as to be adjacent to an axial end of each said roller.

20. A starter according to claim 19, wherein said limiting plate is disposed between said reduction mechanism and said one-way clutch and said pins pass through said limiting plate.

21. A starter according to claim 15, wherein each of said pins is disposed at a circumferential position corresponding to and radially outside a said biasing member chamber.

* * * * *